Patented Feb. 13, 1951

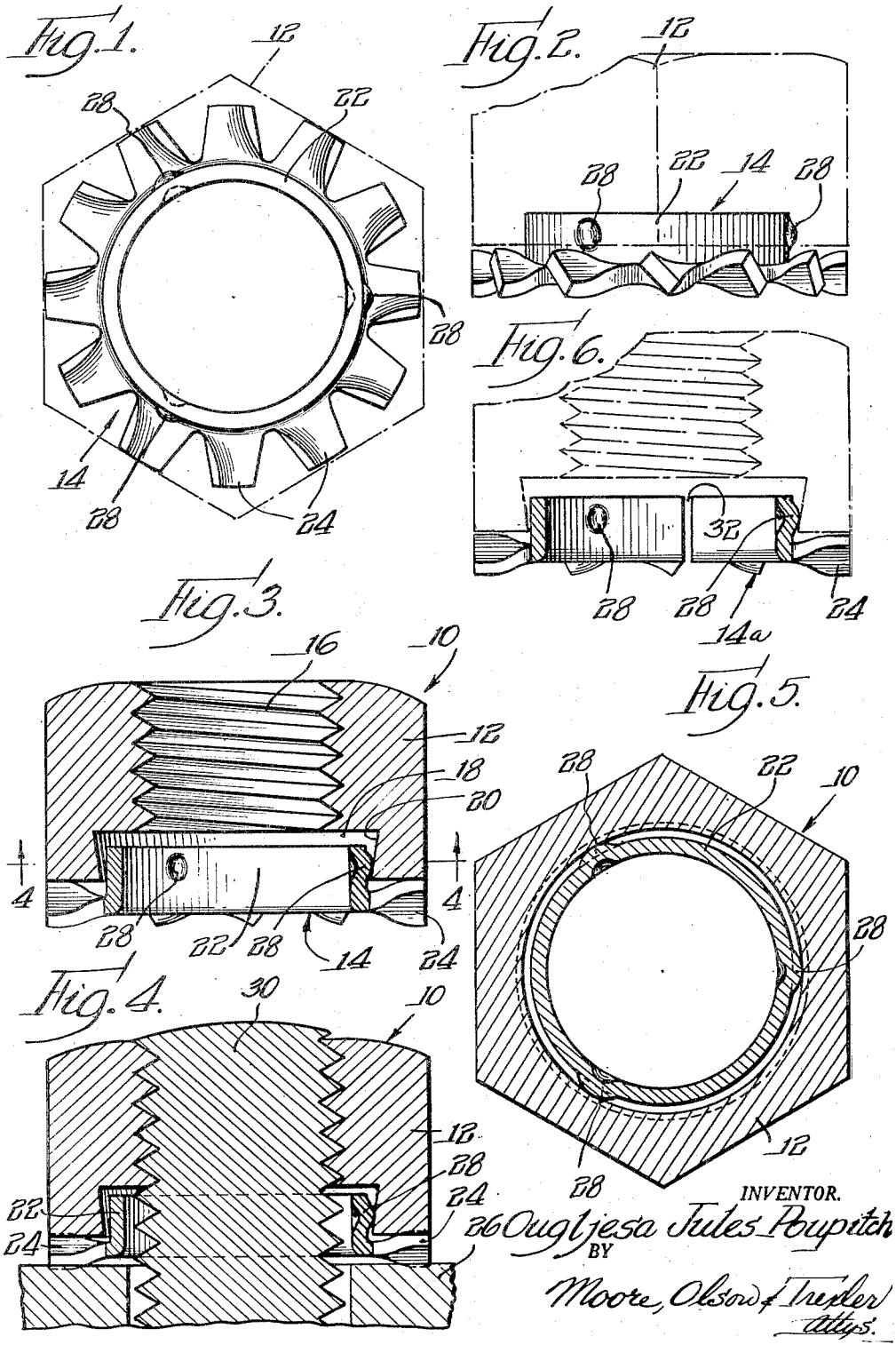

2,541,096

UNITED STATES PATENT OFFICE 2,541,096

PREASSEMBLED NUT AND LOCK WASHER

Ougljesa Jules Poupitch, Chicago, Ill., assignor to Illinois Tool Works, Chicago, Ill., a corporation of Illinois Application April 15, 1949, Serial No. 87,763

3 Claims. (Cl. 151—37)

This invention relates generally to fastening devices and more particularly to fastening devices incorporating lock washers.

This invention is concerned primarily with fastening devices consisting of a lock washer secured in preassembled relation with the clamping side of a rotary, threaded fastener such as a nut. More specifically the invention contemplates a fastener unit of improved practical construction wherein the lock washer element is provided with inner marginal means adapted to interlock with the wall of a counterbore provided in the nut member.

It is an object of the present invention to provide a fastening device of the type referred to above in which a novel structural arrangement of the nut counterbore and annular flange of a lock washer will facilitate the ease with which the parts may be telescopically assembled, and when assembled, these parts will be secured against unauthorized or inadvertent axial separation.

A further object is to provide a preassembled nut and lock washer of the type referred to above in which the lock washer, although secured against axial separation, is free to rotate, thereby assuring maximum locking efficiency.

The foregoing and other objects and advantages will be more apparent from the following detailed description when considered in connection with the accompanying drawing, wherein:

Figure 1 is a plan view of a lock washer of the type contemplated by the present invention, dot and dash lines indicating the outline of a nut in association with said lock washer;

Figure 2 is a side elevational view of the lock washer illustrated in Figure 1, dot and dash lines indicating the outline of a nut associated therewith;

Figure 3 is a central, vertical sectional view of the combined lock washer and nut prior to the application thereof to a work surface;

Figure 4 discloses the fastener unit of Figure 3 tightened against a work surface;

Figure 5 is a transverse sectional view taken substantially along the line 4—4 of Figure 3; and Figure 6 is a vertical sectional view of a modified form of lock washer, the body of said washer being slit to render the same readily collapsible and thereby to fasten the preassembly of the lock washer within the counterbore of a complementary nut member.

Referring now to the drawing wherein like numerals have been employed to designate similar parts throughout the various figures, it will be seen that one embodiment of the present invention is illustrated by a fastener unit which comprises a nut member 12 and a lock washer 14. The nut member 12 is provided with the conventional internally threaded aperture 16, and the clamping side of the nut is provided with a counterbore 18, Figure 3. This counterbore is preferably defined by an annular wall 20 which diminishes in diameter toward the clamping side of the nut. This counterbore 18 is designed to accommodate an axially extending body or flange portion 22 of the lock washer 14.

In the disclosed embodiment, the lock washer 14, in addition to the above-mentioned axially extending body portion 22, includes a plurality of locking prongs 24 extending outwardly from the lower margin of the flange 22. Each of these prongs 24 is warped or twisted so as to present oppositely disposed locking teeth for engaging the clamping surface of the nut on one side and the surface of a work piece 26, Figure 4, on the opposite side. It will be noted that the continuous annular body or flange 22 is provided in three equally spaced points with knobs 28 formed by indenting the inner periphery of the body. The diameter of the circle which is coincident with the outer surfaces of these knobs 28 is slightly larger than the diameter of the counterbore 18 in the vicinity of the clamping surface of the nut 12. Thus, as the flange 22 of the lock washer is telescopically associated with the counterbore 18, these knobs are forced inwardly a sufficient degree to enable them to enter the counterbore, and when the lock washer reaches the position illustrated in Figure 3, these knobs spring back or outwardly to their normal position. In this position they cooperate with the inclined wall surface 20 to prevent inadvertent or unauthorized axial separation of the parts.

Attention is directed to the fact that in the aforesaid preassembled relation of the lock washer and nut, it is preferable to have the lock washer freely rotatable with respect to the nut. That is to say, knobs or protuberances 28 are so designed that they will not vigorously impinge or press against the wall surface 20 but will cooperate with the smaller diameter of said wall to prevent axial separation of the parts. It is important when lock washers of this type shown herein are used, namely, the type incorporating a plurality of twisted locking teeth, that the washer be freely rotatable with respect to the nut at the time the fastening unit is initially tightened against the work surface. During this initial tightening operation, the teeth of the prongs 24 bite into the surfaces of the work 26 thereby permitting the clamping surface of the nut to slide over the locking teeth in contact therewith until the nut has reached its final position of tightening. In Figure 4 the fastener unit 10 has been shown in its final tightened position. In this position the oppositely disposed teeth of each of the prongs 24 firmly bite into the clamping surface of the nut 12 on one side and the surface of the work piece 26 on the other. The fastener unit may be loosened and removed from its complementary screw member 30, and the lock washer will be securely held as a unit with the nut. By employing the knobs or protuberances 28, only areas of limited size need be frictionally engaged by the wall surface 20. That is to say, frictional resistance to telescopic association of the parts is reduced to a minimum, and yet the parts are firmly secured against separation, and the lock washer remains freely rotatable.

By employing the type of protuberances shown in the drawing, the upper portions thereof provide cam surfaces which facilitate initial telescopic assembly of the washer with the nut. It will be noted that the diameter defined by the uppermost portions of the protuberances 28 is less than the diameter of the mouth of the counterbore 18. Hence, as the flange of the washer is initially introduced within said counterbore, the upper curved surfaces of the protuberances 28 exert a camming action against the counterbore wall, thereby facilitating the inward collapsing of the washer flange in the vicinity of said protuberances. The portions of the flange intermediate the protuberances may have a tendency to bulge outwardly to a slight amount but not to such an extent as to interfere with the telescopic assembly of the parts. The lower curved surfaces of the protuberances provide shoulders which cooperate with the counterbore wall in resisting axial separation.

In Figure 6 a slightly modified form of lock washer designated by the numeral 14a is employed. In fact, the only structural difference between the lock washer 14a and the lock washer 14 is that the lock washer 14 is annularly continuous whereas the lock washer 14a is provided with a transverse severance or slot 32 which renders the washer body yieldably collapsible. In some instances it may be preferable to rely on the yieldability or collapsibility of the washer body to facilitate telescopic assembly of the parts. In the fastener shown in Figures 1 to 5, inclusive, the washer body or flange 22 is continuous, and hence the resiliency of the continuous annulus must be overcome in order to spring the knobs or protuberances 28 over the minimum diameter of the counterbore wall 20. In instances where additional resiliency would be of advantage, the severed or noncontinuous body portion may be employed. In both forms the circle normally defined by the outermost points of the knobs 28 must be slightly greater than the minimum diameter of the frusto conical wall of the counterbore.

From the foregoing it will be apparent that the present invention contemplates a fastener unit of extremely simple and practical construction, wherein the ease with which the axial body portion of a lock washer may be telescopically associated with the counterbore of a nut. Furthermore, the invention is of particular practical significance when lock washers of the type employing marginal, twisted locking teeth are employed. That is to say, the arrangement of the counterbore wall and the circumferentially spaced protuberances is such as to reduce to a minimum axial pressure required to establish telescopic assembly of the parts, and to assure after such telescopic assembly a freely rotatable lock washer held firmly against inadvertent axial separation.

It has been found practical to provide a counterbore wall of diminished diameter in the vicinity of the clamping surface of the nut by first forming a counterbore defined by a cylindrical wall and then subjecting the material of the nut adjacent said counterbore to sufficient pressure so as to cause the counterbore wall to be swaged inwardly. This inwardly swaged wall section provides a shoulder which is adapted to interlock with the protuberances projecting outwardly beyond the periphery of the annular washer body to secure the lock washer and nut against inadvertent axial separation.

While for the purpose of disclosing one practical application of the invention certain specific structural features have been illustrated, it will be apparent that other modifications and changes may be made without departing from the spirit and scope of the appended claims.

The invention is hereby claimed as follows:

1. A preassembled nut and washer unit including a nut member having a counterbore on the clamping side thereof, said counterbore in the vicinity of the clamping surface of the nut being defined by a substantially continuous wall section of minimum diameter communicating with an inner wall section of increased diameter, a lock washer including an axially extending annular body portion having a laterally deformable free or entering margin positioned within said counterbore, a plurality of integral axially deflected locking teeth extending radially outwardly from the other margin of said body portion, and a plurality of circumferentially spaced protuberances presenting washer retaining shoulders extending radially outwardly from the external periphery of said body portion, the entering portions of said protuberances positioned in the vicinity of said free body margin, the outermost portions of said protuberances normally defining a diameter greater than said minimum counterbore diameter but not greater than said counterbore wall of increased diameter and capable of being urged inwardly in opposition to the resistance of said annular washer body as an incident to initial engagement of said protuberances with said counterbore wall section of minimum diameter during the telescopic assembly thereof, the edge of the free margin of said washer body portion terminating sufficiently short of the bottom of said counterbore to permit relative limited axial shifting of the washer and nut, said outermost portions of the protuberances being located within the area determined by the wall of increased diameter to assure relative rotatability of the washer and nut, and the shoulders of said protuberances coacting with the wall section of minimum diameter to retain said parts against axial separation.

2. A preassembled nut and washer unit in accordance with claim 9, wherein the entering portions of the protuberances provide cam surfaces to facilitate initial telescopic association of the washer body within the nut counterbore.

3. A preassembled nut and washer unit in accordance with claim 9, wherein the circumferentially spaced protuberances are relatively rigid, and the annular washer body sufficiently resilient to collapse when the protuberances engage the wall section of minimum diameter during the initial telescopic assembly of the washer and nut.

OUGLJESA JULES POUPITCH.

REFERENCES CITED

The following references are of record in the file of this patent:

UNITED STATES PATENTS

| Number | Name | Date |
|---|---|---|
| 2,128,429 | Olson #1 | Aug. 30, 1938 |
| 2,225,654 | Olson #2 | Dec. 24, 1940 |
| 2,424,208 | Poupitch | July 15, 1947 |

FOREIGN PATENTS

| Number | Country | Date |
|---|---|---|
| 231,366 | Great Britain | Apr. 2, 1925 |
| 244,676 | Great Britain | Dec. 24, 1925 |